(12) United States Patent
Manz et al.

(10) Patent No.: US 11,275,057 B2
(45) Date of Patent: Mar. 15, 2022

(54) PHOTOACOUSTIC SENSOR VALVE

(71) Applicant: Infineon Technologies AG, Neubiberg (DE)

(72) Inventors: Johannes Manz, Munich (DE); Wolfgang Klein, Zorneding (DE); David Tumpold, Kirchheim b Muenchen (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 356 days.

(21) Appl. No.: 16/374,192

(22) Filed: Apr. 3, 2019

(65) Prior Publication Data
US 2020/0319144 A1    Oct. 8, 2020

(51) Int. Cl.
*G01N 29/24* (2006.01)
*G01N 1/22* (2006.01)

(52) U.S. Cl.
CPC .......... *G01N 29/2425* (2013.01); *G01N 1/22* (2013.01)

(58) Field of Classification Search
CPC .......... G01N 1/22; G01N 1/2273; G01N 2021/1704; G01N 21/1702; G01N 2291/02809; G01N 29/14; G01N 29/2425; G01N 2001/205; G01N 2001/2057; G01N 30/20; G01N 2030/201; G01N 2030/204; G01N 2030/205; G01N 2030/328; G01N 2030/385; G01N 2035/00237; G01N 2035/00247; G01N 35/1097; F16K 99/0015; F16K 99/0025
See application file for complete search history.

(56) References Cited

U.S. PATENT DOCUMENTS

| | | | |
|---|---|---|---|
| 4,515,997 A | 5/1985 | Stinger, Jr. | |
| 5,689,570 A | 11/1997 | Taylor | |
| 5,699,130 A | 12/1997 | Taylor | |
| 6,403,995 B2 | 6/2002 | Thomas | |
| 7,034,943 B1 * | 4/2006 | Moeckli | C07K 14/705 356/423 |
| 7,089,069 B2 | 8/2006 | Gabriel et al. | |
| 8,773,297 B2 | 3/2014 | Martin et al. | |
| 8,780,673 B2 | 7/2014 | Cohen et al. | |
| 8,983,097 B2 | 3/2015 | Dehe et al. | |
| 9,002,037 B2 | 4/2015 | Dehe et al. | |
| 9,024,396 B2 | 5/2015 | Dehe | |
| 2001/0048123 A1 | 12/2001 | Thomas | |
| 2003/0044029 A1 | 3/2003 | Gabriel et al. | |

(Continued)

FOREIGN PATENT DOCUMENTS

| | | |
|---|---|---|
| CN | 101390287 A | 3/2009 |
| CN | 101512897 A | 8/2009 |

(Continued)

*Primary Examiner* — John Fitzgerald
*Assistant Examiner* — Truong D Phan
(74) *Attorney, Agent, or Firm* — Slater Matsil, LLP

(57) ABSTRACT

A system for measuring gas concentration includes a package having a cavity and a port, a photoacoustic gas sensor device within the package, and a Micro Electro Mechanical System ("MEMS") valve separate from the photoacoustic gas sensor device placed over the port of the package and to allow ambient gas diffusion into the cavity in a first mode of operation, and to prevent ambient gas diffusion into the cavity and to acoustically isolate the cavity in a second mode of operation.

12 Claims, 17 Drawing Sheets

(56) References Cited

U.S. PATENT DOCUMENTS

| | | |
|---|---|---|
| 2008/0104825 A1 | 5/2008 | Dehe et al. |
| 2008/0252891 A1* | 10/2008 | Uber .................. G01N 21/1702 |
| | | 356/437 |
| 2009/0182524 A1 | 7/2009 | Stephanson |
| 2011/0115337 A1 | 3/2011 | Nakamura et al. |
| 2011/0233693 A1 | 9/2011 | Perruchot et al. |
| 2012/0086367 A1 | 4/2012 | Iyad Al Dibs et al. |
| 2012/0151994 A1* | 6/2012 | Hung .................. G01N 21/1702 |
| | | 73/24.02 |
| 2013/0223023 A1 | 8/2013 | Dehe et al. |
| 2015/0014796 A1 | 1/2015 | Dehe |
| 2015/0130325 A1 | 5/2015 | Suenaga |
| 2015/0198431 A1 | 7/2015 | Uchida |
| 2017/0201192 A1 | 7/2017 | Tumpold et al. |

FOREIGN PATENT DOCUMENTS

| | | |
|---|---|---|
| EP | 2033480 B1 | 7/2012 |
| WO | 2009066290 A2 | 5/2009 |
| WO | 2016166763 A2 | 10/2016 |

* cited by examiner

PHOTOACOUSTIC SENSOR VALVE

TECHNICAL FIELD

The present invention relates generally to a system and method, and, in particular embodiments, to a system and method comprising a PhotoAcoustic Sensor ("PAS") valve.

BACKGROUND

Applications for gas sensors have gained significant interest in the past few years due to growing concerns over air pollution and global climate change. For example, carbon dioxide sensors are commonly used to measure machine emissions and indoor air quality. There are a number of general methods of measuring a gas concentration. A chemical sensor measures a gas concentration by measuring an electrical property of a gas sensitive material, such as a metal oxide (MOX) or graphene. On the other hand, a physical sensor measures a gas concentration by exposing a gas sample to an infrared light source and performing a physical measurement on the gas. For example, a non-dispersive infrared absorbance (NDIR) sensor measures the absorption of the infrared light a certain wavelengths and determines the gas concentration based on the amount of light absorption; and a photoacoustic sensor measures a change in pressure of the gas sample in the presence of infrared light and determines the gas concentration based on the change in pressure of the gas.

Photoacoustic sensors, which generally include an infrared light source and a microphone, are well-suited to low-cost and mass producible implementations because of their small size and their ability to be manufactured using common commercial semiconductor and packaging technologies. One issue with photoacoustic sensors, however, is their sensitivity to acoustic noise. Acoustic noise produced by machinery, traffic, or even human activity may interfere with the photoacoustic sensor's ability to perform acoustic measurements and degrade the accuracy of the sensor.

SUMMARY

In accordance with an embodiment, a system comprises a package having a cavity and a port; a photoacoustic gas sensor device disposed within the package; and a Micro Electro Mechanical System ("MEMS") valve separate from the photoacoustic gas sensor device disposed at the port of the package and configured to allow ambient gas diffusion into the cavity in a first mode of operation, and to prevent ambient gas diffusion into the cavity and to acoustically isolate the cavity in a second mode of operation.

In accordance with another embodiment a method of operating a photoacoustic gas sensor device comprises opening a Micro Electro Mechanical System ("MEMS") valve at a port of the photoacoustic gas sensor to allow gas diffusion through the port and into a cavity of the photoacoustic gas sensor in a first mode of operation; and closing the MEMS valve to prevent gas diffusion through the port and into the cavity of the photoacoustic gas sensor and to acoustically isolate the cavity of the photoacoustic gas sensor in a second mode of operation, wherein the MEMS valve is not configured to sense internal gas pressure of the photoacoustic gas sensor device.

In accordance with a further embodiment a monolithic acoustic valve comprises a perforated insulated silicon backplate or other perforated backplate coupled to a substrate; and a perforated silicon membrane or other perforated membrane coupled to the substrate, wherein perforations in the backplate and non-overlapping perforations in the membrane comprise a radial pattern emanating from a center portion of the valve to a peripheral portion of the valve in a plan view, and wherein the radial pattern comprises an inner pattern and a non-overlapping outer ringed pattern.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
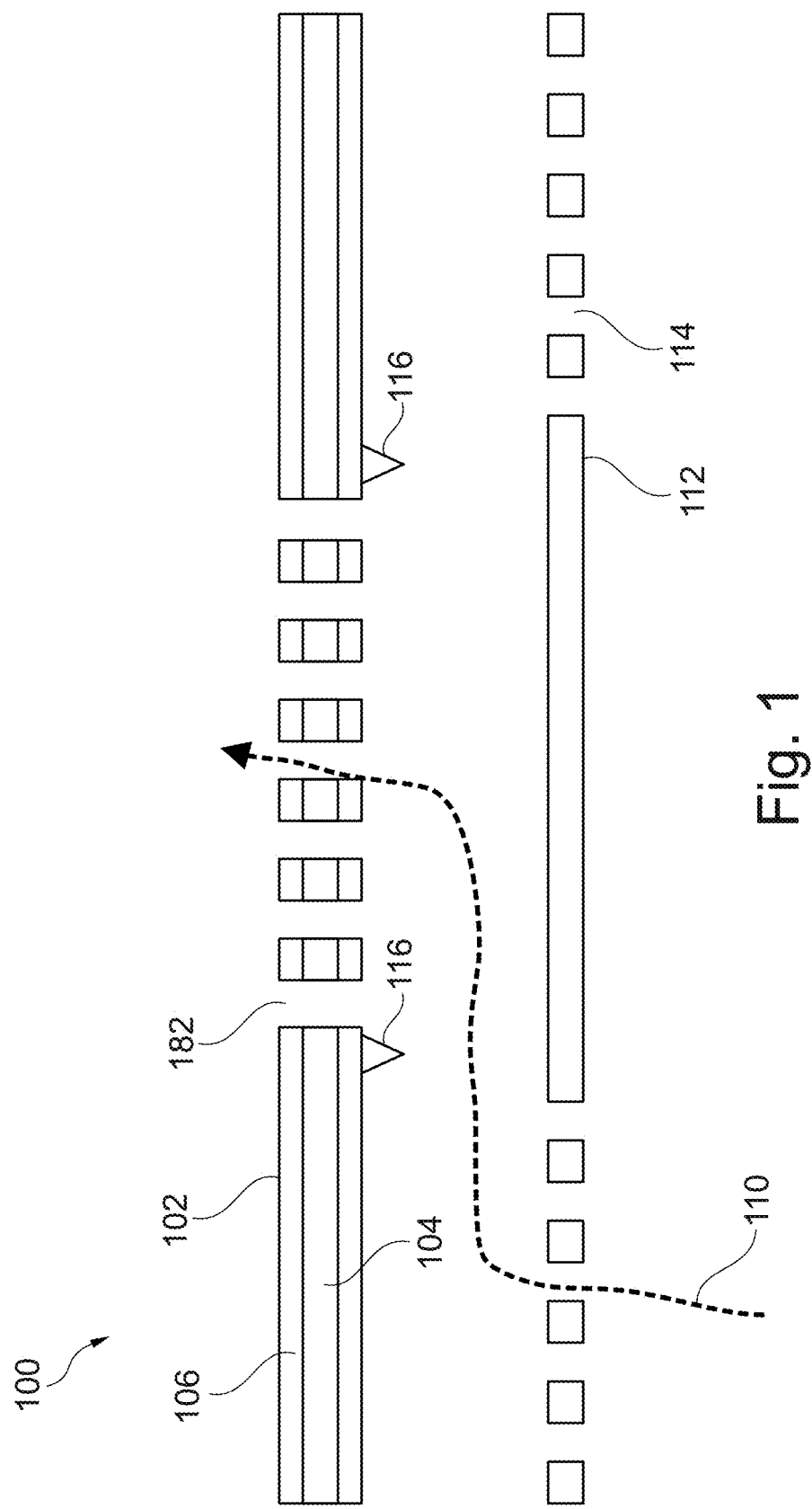
FIG. 1 is a cross-sectional view of a PAS valve in an open configuration, according to an embodiment.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for estimating a gas concentration using a photoacoustic sensor (PAS). Generally, a photoacoustic sensor includes an infrared (IR) light source that emits a time modulated IR emission, an optical filter and a detection volume with an integrated microphone that detects the photoacoustic pressure changes caused by the absorption of IR light taking place in the gas volume due to the presence of the measured gas, such as carbon dioxide. These measured pressure changes are used to estimate the concentration of the gas present. One advantageous aspect of photoacoustic gas sensors, especially microphone-based open non-resonant photoacoustic sensors, is the ability to implement such sensors inexpensively in very small form-factors, thereby making such sensors suitable for use in mobile and home applications. Such open non-resonant photoacoustic sensors include, for example, a microphone placed an a measurement volume, where the measurement system operates at relatively low frequencies, for example, less than 100 Hz. Microphone-based photoacoustic sensors, however, are sensitive to acoustic noise and interference. Accordingly, embodiments of the present invention are directed toward photoacoustic measurement systems that mitigate the effect of acoustic noise on photoacoustic measurements.

Further detailed description of the operation and structure of photoacoustic sensors can be found in co-pending patent application Ser. No. 16/240,187 entitled "System and Method for Estimating a Gas Concentration", which is hereby incorporated by reference in its entirety as though fully and completely set forth herein.

According to an embodiment a MEMS valve (also referred to herein also as a PAS valve) based on silicon microphone technology is described that is suitable for use with a photoacoustic gas sensor to be used as an acoustic barrier such that precise measurements of gas concentrations can be made even in extremely loud operating environments. The PAS valve is based on silicon microphone technology to open and close a port in the photoacoustic sensor to provide access to an internal measurement cavity thereof. The PAS valve in a closed configuration has high acoustic tightness and thus good suppression of the external sound source (up to 120 dB). The PAS valve in an open configuration has high diffusion speed, in an embodiment, so that ambient gas desired to be detected can easily diffuse into the internal measurement cavity of the photoacoustic gas sensor. The PAS valve is thus configured for suppressing external sound, maintaining a static position within the photoacoustic gas sensor, and having a rigid structure, and not having displacement, especially in the closed configuration.

According to embodiments, the PAS valve comprises a multi-membrane structure with a plurality of parallel membranes. In some embodiments only two membranes are used, but in other embodiments three or even more membranes can be used. Each membrane includes a pattern of perforations or holes that are not congruent (non-overlapping) with each other so that the PAS valve can be completely open or closed. Other embodiments have partially overlapping perforations that are described in further detail below. At least one of the membranes is flexible to form a perforated silicon layer, in an embodiment, and can be attracted to the other membrane by a suitable application of energizing voltage to one or more of the membranes. The attraction of the membranes is due to the electrostatic forces (attractive forces) caused by the application of the energizing voltage(s). At least one of the membranes may be static and referred to as a "backplate", and also can be insulated to form a perforated insulated silicon layer, in an embodiment, to prevent closed membranes from causing an electrical short circuit. After the membranes become physically attached to each other, the transmission impedance becomes very low, which comprises a very stiff, solid and rigid composite membrane which is acoustically tight. An open PAS valve configuration is achieved if the membranes are in their idle position, and therefore a low impedance transmission channel is created between a bottom surface of the PAS valve and a top surface of the PAS valve. A closed PAS valve configuration is achieved if both membranes are pulled towards each other due to the applied electrostatic forces so that the perforations in one of the membranes are closed off or covered by a solid portion of an adjacent membrane, and the corresponding impedance or transmission changes from low to high.

According to embodiments, the PAS valve includes a bulk silicon frame (integrated circuit) comprising, for example, a deep trench or a Bosch hole (formed using a high-aspect ratio plasma etching process) to generate a cavity within the valve for the placement of the membranes. The membranes are thin structures having perforations that are aligned with the cavity. The perforations can be of a uniform size or can be of various sizes. The patterns of the perforations are described in further detail below. Second and subsequent membranes are located above or below a first membrane with a small gap. The holes or perforations in each of the membranes can be non-overlapping or misaligned in an embodiment. Other structures such as rings or bumps can be used to close off possible diffusion paths and to prevent membranes from sticking together with such a force that they become hard to separate when a subsequent open configuration is required.

Other embodiments described in further detail below include unequal gaps between the membranes, various perforation configurations for controlling diffusion speed, and adjustment of the transmission channel impedance via different gap positions to create semi-transparent operational states (analog PAS valve). The analog PAS valve can be used, for example, with a dual port microphone to change the acoustic coupling impedance between a back volume and a front volume of the photoacoustic gas sensor. Finally, external circuitry can be used to supply a control signal or voltage to open and close the gap between membranes in the PAS valve. The external circuitry can comprise an application specific integrated circuit (ASIC) for controlling the valve states, including an open configuration, a closed configuration, or analog states with partially open and partially closed configurations.

FIG. 1 is a cross-sectional view of a portion of a PAS valve 100 in an open configuration, according to an embodiment, comprising a first fixed membrane 102 and a flexible membrane 112. The fixed membrane 102 is also referred to as a backplate herein, and is stiff and rigid once insulated. The backplate 102 includes, for example, a silicon membrane portion 104 and silicon nitride insulating layers 102 on a top surface and a bottom surface of silicon membrane portion 104 for high tensile strength. Backplate 102 includes a plurality of perforations or holes 108 in a central portion, and a ringbump 116 (also referred to as a bumpring) surrounding the perforations 108. The ringbump 116 extends around the perforations 108 in a plan view (not shown in FIG. 1), and can be fabricated from an insulating material such as silicon dioxide or silicon nitride. The location of the ringbump 116 is shown and described below with reference to FIG. 3. Flexible membrane 112 includes a plurality of perforations or holes 114 in a non-overlapping section, with respect to the perforations in backplate 102. In FIG. 1, the perforations 114 are shown in an outer portion of the flexible membrane 112. Flexible membrane 112 can be fabricated from silicon and need not be insulated. While backplate 102 is shown above flexible membrane 112, backplate 102 can be formed below flexible membrane in an embodiment of the PAS valve 100. The ring structure or bump structure 116 on the interface between the backplate 102 and the membrane 112 is used both for providing an anti-sticking feature, and for improving the closed sealing quality in a closed configuration described below.

An exemplary gas diffusion path 110 is shown emanating from the ambient environment external to the photoacoustic gas sensor, passing through perforations 114 of the flexible membrane 112, passing through a gap between the flexible membrane 112 and backplate 102, passing through perforations 108 in the backplate 102, and into the internal sensing cavity of the photoacoustic gas sensor.

Acoustic suppression level time (time for the PAS valve 100 to achieve a closed configuration) can be below one millisecond. This amount of time is reasonable with respect to the time needed to measure the gas concentration within the internal sensing cavity, which can be between 0.1 seconds and 100 seconds. Diffusion time from the ambient environment into the internal sensing cavity can be increased by using multiple PAS valves 100 (that can be integrated onto a single integrated circuit if desired) in parallel.

Figure 2:
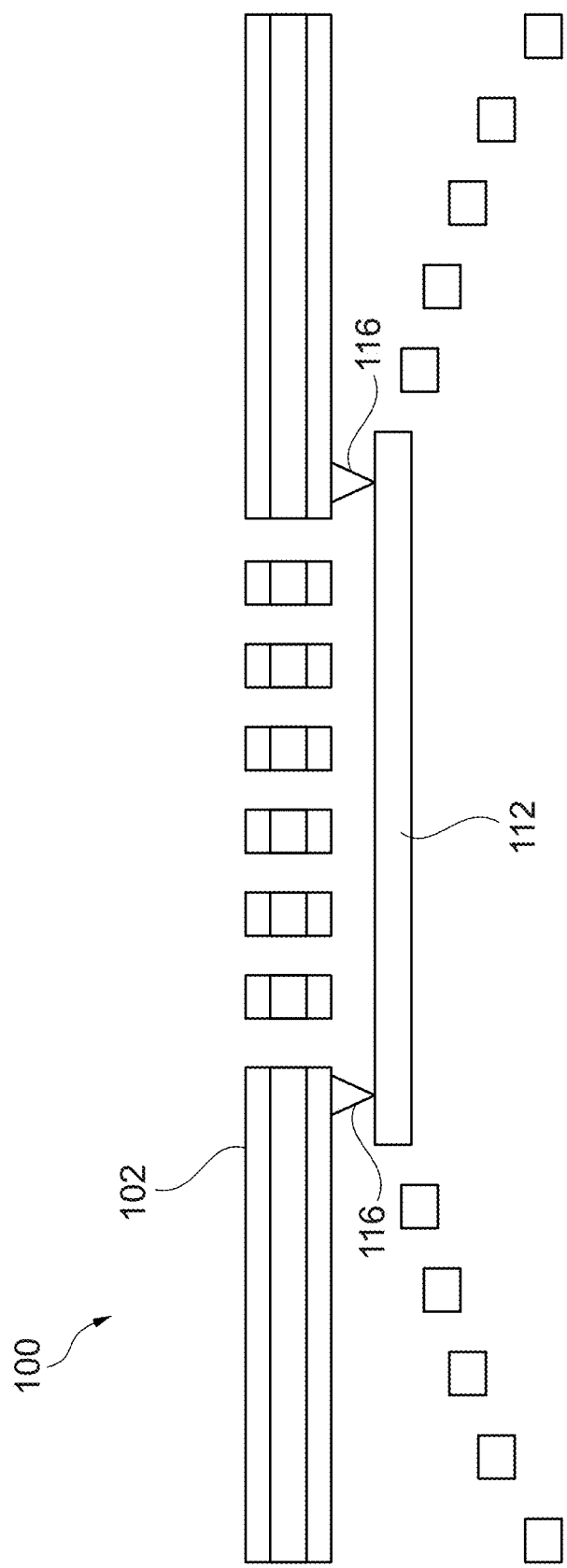
FIG. 2 is a cross-sectional view of the PAS valve of FIG. 1 in a closed configuration.

FIG. 2 is a cross-sectional view of the PAS valve 100 of FIG. 1 in a closed configuration, wherein flexible membrane 112 is attracted to backplate 102 due to electrostatic forces generated by the application of a voltage to either flexible membrane 112 or backplate 102, or both. No gas diffusion path exists or is shown in FIG. 2. While gas diffusion is blocked by the non-overlapping design of the perforations in the flexible membrane 112 and the backplate 102, gas diffusion is also blocked by the action of ringbump 116, thus presenting a completely sealed, rigid, and acoustically tight structure between the external ambient environment and the internal sensing cavity of the gas photoacoustic sensor.

Figure 3:
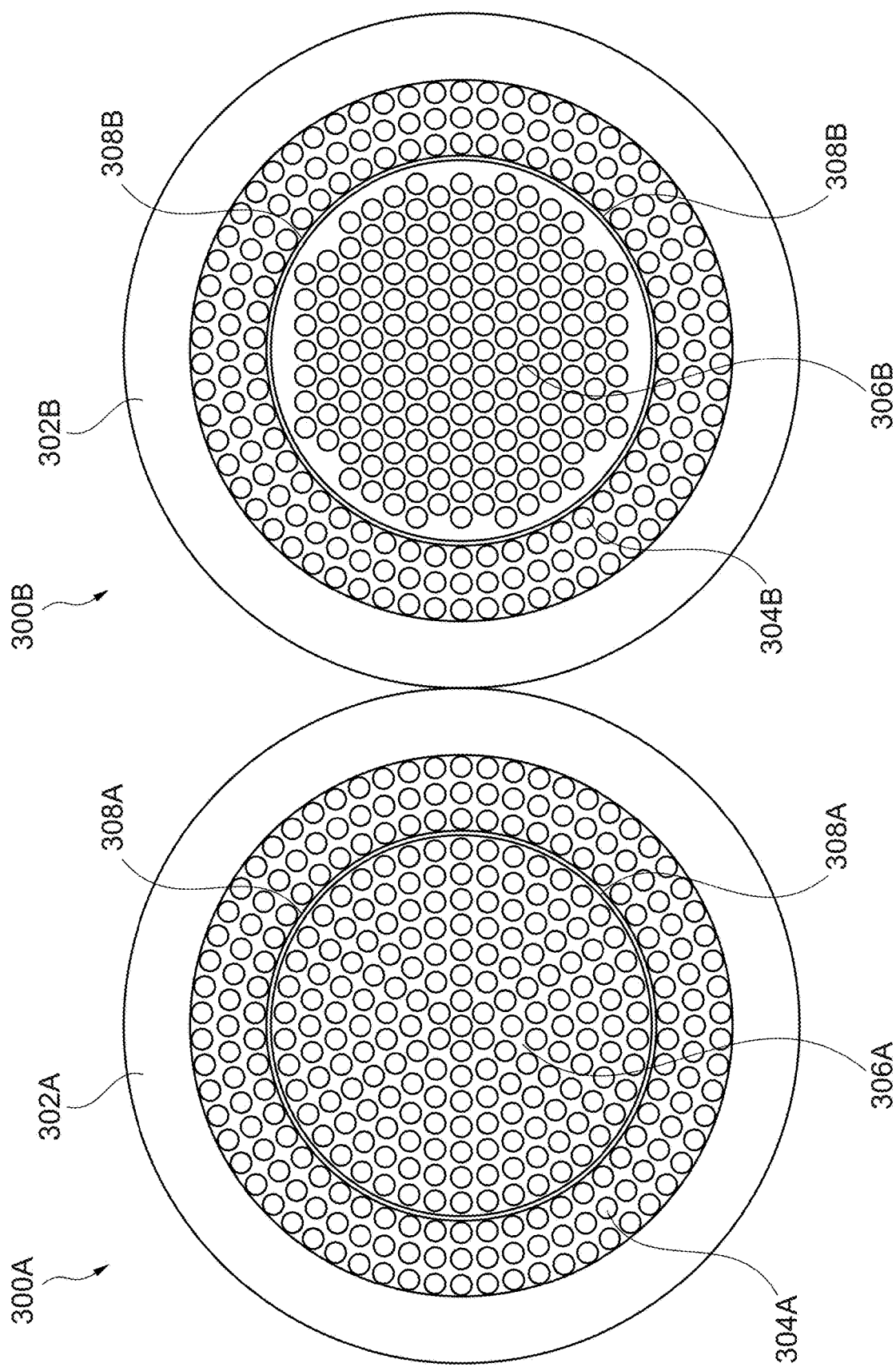
FIG. 3 is a plan view of a PAS valve having a circular radial concentric pattern of perforations, and a plan view of a PAS valve having a hexagonal radial concentric pattern of perforations, according to embodiments.

FIG. 3 is a plan view of a PAS valve 300A having a concentric circular pattern of perforations, and a plan view of a PAS valve 300B having a concentric hexagonal pattern of perforations, according to embodiments. PAS valve 300A can include backplate 102 in an upper position and a flexible membrane 112 in a lower position as is shown in FIGS. 1 and 2. However, the order of the backplate 102 and the flexible membrane 112 can be reversed, with backplate 102 in the lower position and flexible membrane 112 in the upper position. Thus, the identification numerals used in FIG. 3 refer to zones or portions in the plan view that are applicable to both configurations described above, and the identification numerals of FIGS. 1 and 2 are omitted for ease in understanding the zones or portions of the plan view. Exemplary perforation or hole position configurations include a concentric circular pattern 306A in a center portion of a membrane or backplate (which can be in the upper or lower position), and a non-overlapping ringed circular pattern 304A in an outer portion of a backplate or membrane (which can be in the lower or upper position). Portion 302A of the PAS valve 300A shows a portion of the membrane and backplate not including any perforations. Exemplary perforation or hole position configurations may also include a concentric hexagonal pattern 306A in a center portion of a membrane or backplate (which can be in the upper or lower position), and a non-overlapping ringed hexagonal pattern 304B in an outer portion of a backplate or membrane (which can be in the lower or upper position). Portion 302B of the PAS valve 300B shows a portion of the membrane and backplate not including any perforations.

The plan view location of the bumpring 116 is shown in FIG. 3 as a circular ring 308A of PAS valve 300A and is shown as a circular ring 308B of PAS valve 300B. The cross-sectional location of bumpring 116 was previously described with respect to FIGS. 1 and 2.

Figure 4:
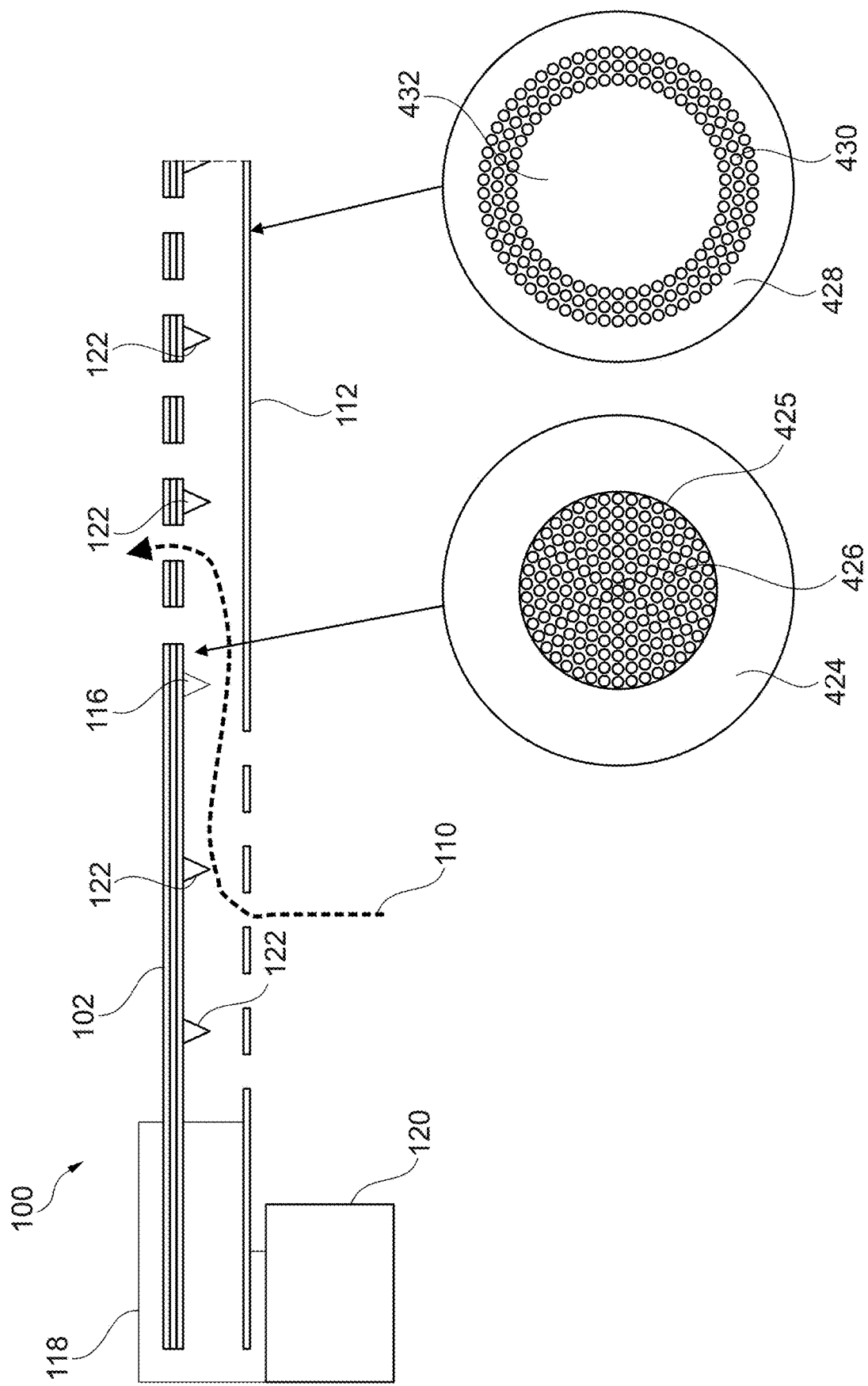
FIG. 4 is a more detailed cross-sectional view of a PAS valve in an open configuration, according to an embodiment.

FIG. 4 is a more detailed cross-sectional view of a PAS valve 400 in an open configuration, according to an embodiment. Single backplate PAS valve 400 is similar to the embodiment shown in FIGS. 1 and 2, but further structures are shown, such as an oxide layer portion 118 and a substrate 120. PAS valve 400 thus comprises a silicon or other substrate 120 having a vertical sidewall defining the extent of the cavity of the valve. An oxide layer portion (also referred to as a clamping layer) 118 affixes backplate 102 and flexible membrane 112 to the substrate 120. Oxide layer portion 118 also defines the gap between backplate 102 and flexible membrane 112. Backplate 102 can be silicon as previously described, and includes silicon nitride insulation layers. Backplate 102 can include an insulative bumpring 116 previously described, and insulative bumps 122. Insulative bumpring 116 and insulative bumps 122 are used as part of the gas diffusion barrier, and also to prevent sticking between the backplate 102 and the flexible membrane 112 when the valve is returned to an open configuration after attaining a closed configuration.

Plan views of backplate 102 and membrane 112 are also shown in FIG. 4, with corresponding identification numerals identifying specific zones or regions that are specific to the configuration shown in FIG. 4 (backplate 102 in the upper position, and membrane 112 in the lower position). The plan view of the exemplary backplate 102 is shown in FIG. 4, including an inner portion having a concentric circular perforation pattern 426 and an outer portion 424 lacking any perforations. A plan view of the exemplary flexible membrane 112 is shown in FIG. 4, including a corresponding circular inner portion lacking any perforations, a first outer portion 430 comprising a concentric ringed perforation pattern 430, and a second outer portion 428 comprising a ringed portion lacking any perforations. Note that in FIG. 4 the holes in the backplate 102 and the holes in the flexible membrane 112 are completely non-overlapping and confined to specific respective zones, in an embodiment. In FIG. 4, the insulative bumps (insulated anti-sticking bumps) 122 may be located in any of the solid areas shown in either zones 426 or 428 shown in the plan view of backplate 102. The insulative bumpring 116 is shown in the location of a circular ring 425 between zones 424 and 426.

Figure 5:
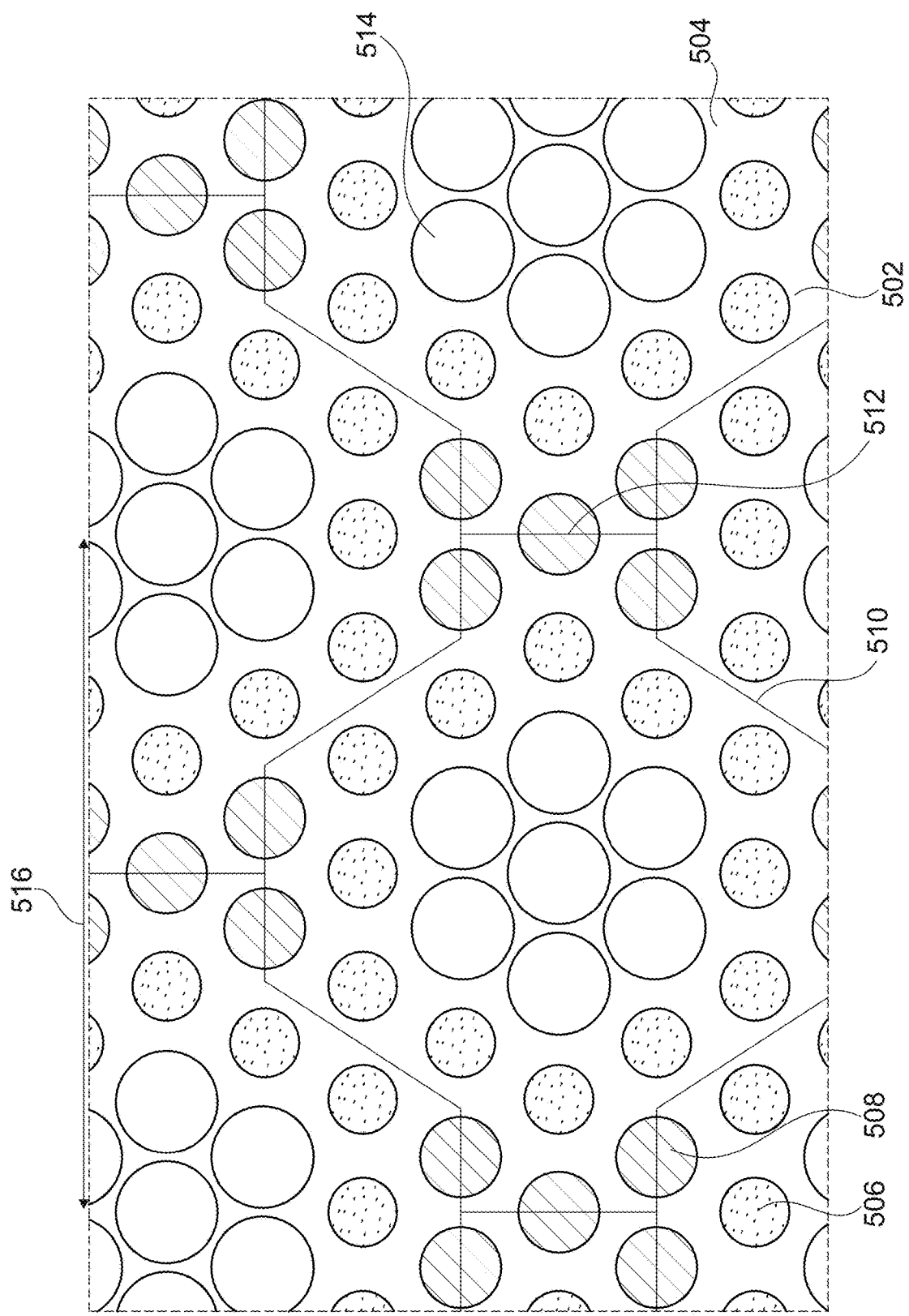
FIG. 5 is a plan view of a PAS valve having an alternative hexagonal pattern of perforations, according to another embodiment.

FIG. 5 is a plan view of a PAS valve having an alternative hexagonal pattern of perforations, according to another embodiment. Alternative hole positions 506, 508, 514 and alternative "sealing rings" 504 are shown and described in further detail below. The plan view in FIG. 5 thus shows a top level backplate 502 having a plurality of perforations 514 configured in hexagonal pattern of seven holes 514 as shown. While the underlying membrane is not shown in FIG. 5 for ease of understanding the hexagonal pattern of perforations, the holes 506 and 508 in the membrane are shown through the overlying backplate 502. That is, for ease of viewing, the backplate 502 is deemed to be partially transparent so that the underlying holes in the membrane can be seen from underneath. The membrane thus includes a hexagonal pattern of smaller sized holes 506 surrounding the hexagonal pattern of seven holes 514 in the backplate 502 described above. The remaining membrane holes comprise a pattern of five medium sized holes 5o8. The narrowest vertical distance 512 between interlocking hexagonal pattern zones 510 is about a third of the lateral pitch, although a corresponding range of distances can be used in a particular application. Finally, a plurality of insulative sealing rings 504 similar in function to that of the ringbump previously described are used to block the diffusion path through the holes 506 and 508 in the underlying membrane and the holes 514 in the overlying backplate 502.

Numerous circular, hexagonal, and other types of perforation configurations such as, for example, random configurations are possible in addition to those perforation patterns shown in FIGS. 3, 4, and 5. While other non-overlapping hole patterns may be used as desired, such patterns may be carefully selected to not put excessive stress on any individual sections of the membranes or backplates that could lead to damage and eventual failure of the PAS valve in some embodiments.

Figure 6:
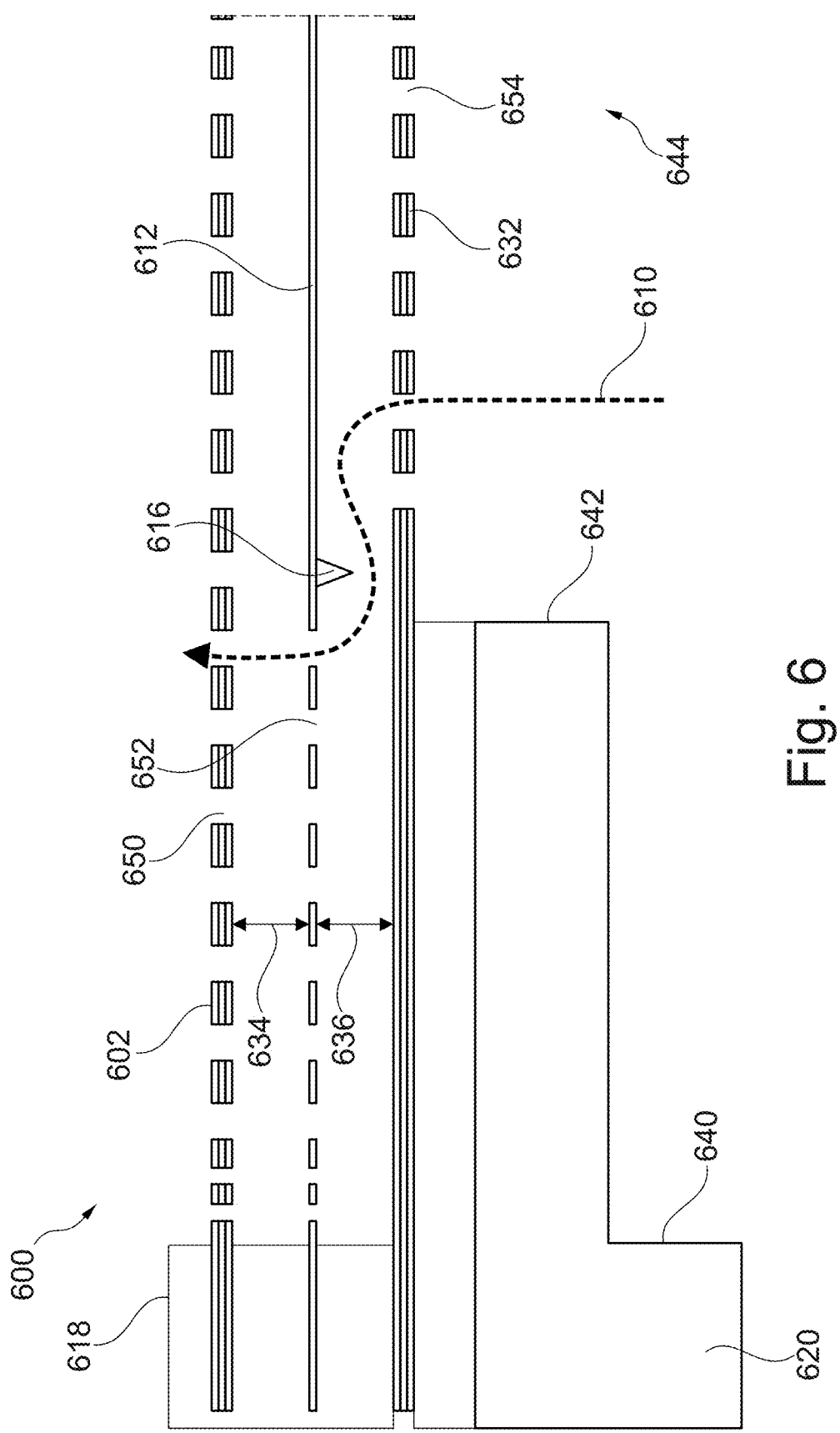
FIG. 6 is a cross-sectional view of a PAS valve in an open configuration having two backplates and a membrane located between the two backplates, according to another embodiment.

FIG. 6 is a cross-sectional view of a PAS valve 600 in an open configuration having two backplates 602 and 632, and a membrane 612 located between the two backplates, according to another embodiment. Upper backplate 602 can comprise a rigid insulated silicon backplate having a plurality of perforations 650 extending across the entirety of the backplate. While the size and spacing of the perforations 650 can be constant within a center portion of the backplate 602, the size and spacing of the perforations can be changed, for example, decreased, within the edge portions of the backplate. Membrane 612 can comprise a flexible uninsulated silicon membrane having a plurality of perforations 652 in an outer ringed portion of the membrane. Membrane 612 can also comprise a ringbump 616 or individual bump structures (not shown in FIG. 6). Alternatively, the ringbump or individual bump structure can be placed on the lower backplate 632. While the size and spacing of the perforations 652 can be constant with the outer ringed portion of the membrane 612, the size and spacing of the perforations can be changed, for example, decrease within the edge portions of the membrane. Note that the perforations 652 of the membrane 612 are configured to be completely overlapping (congruent) with the perforations 650 of the upper backplate 602 to allow for an active opening mode of operation that will be explained in further detail below. Lower backplate 632 can comprise a rigid insulated silicon backplate or an additional perforated insulated silicon backplate having a plurality of perforations 654 in a central portion of the backplate. The central portion of lower backplate 632 is generally aligned with the cavity 644 of the PAS valve 600. The distance between the upper backplate 602 and the membrane 612 defines a first gap 634, and the distance between the membrane 612 and the lower backplate 632 defines a second gap 636. In the embodiment shown in FIG. 6, gaps 634 and 636 are equal. Other gap embodiments are discussed in further detail below.

Also shown in FIG. 6 is a silicon or other suitable material cantilevered substrate 620 that provides additional rigidity for the PAS valve 600. Cantilevered substrate 620, which can comprise a cantilevered silicon substrate in an embodiment, includes a first vertical sidewall 64o and a second vertical sidewall 642 that define a boundary of the cavity 644 on one side of the PAS valve 600. An oxide layer 618 provides a clamping structure for affixing the end portions of upper backplate 602, membrane 612, and lower backplate 632.

In an open configuration of PAS valve 600 an exemplary gas diffusion path 610 is shown emanating from the ambient environment external to a photoacoustic gas sensor, passing through the cavity 644 of valve 600, passing through perforations 654 of the bottom backplate 632, passing through gap 636, passing through perforations 652 of the flexible membrane 612, passing through gap 634, passing through perforations 650 in the upper backplate 602, and into the internal sensing cavity of the photoacoustic gas sensor.

Figure 7A:
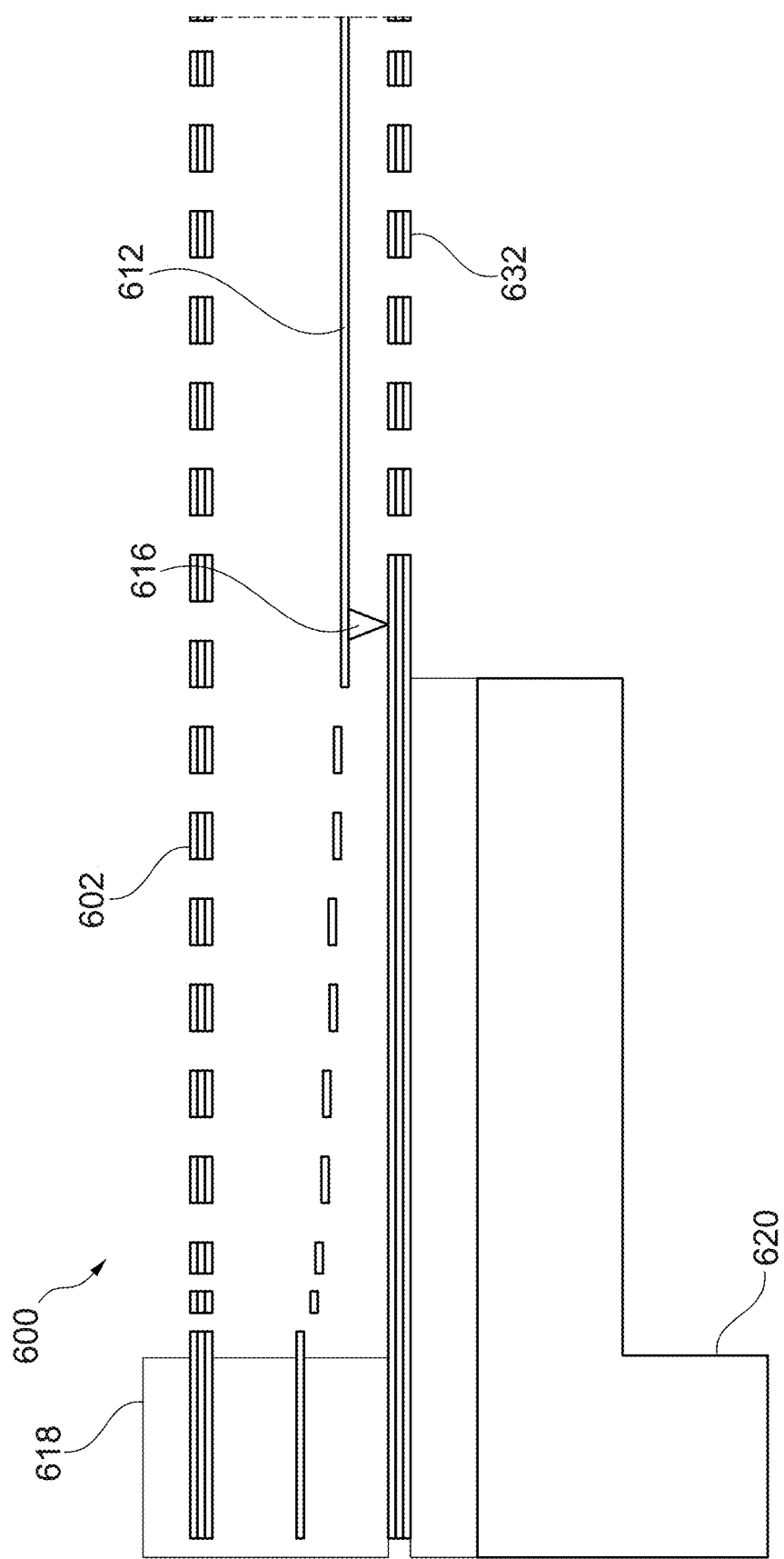
FIG. 7A is a cross-sectional view of the PAS valve of FIG. 6 in a closed configuration.

FIG. 7A is a cross-sectional view of the PAS valve 600 of FIG. 6 in a closed configuration. Not all of the identifying numerals from FIG. 6 are used in FIG. 7A for ease of understanding the closed configuration of valve 600. Flexible membrane 612 is attracted to lower backplate 632 due to electrostatic forces generated by the application of a voltage to either flexible membrane 612 or lower backplate 632, or both. (Individual voltage terminals of the PAS valve and a corresponding bias and switching circuit is shown and described in further detail below with respect to block diagram FIG. 11B.) No gas diffusion path exists or is shown in FIG. 7A. While gas diffusion is blocked by the non-overlapping design of the perforations in the flexible membrane 612 and the lower backplate 632, gas diffusion is also blocked by the action of ringbump 616, thus presenting a completely sealed rigid and acoustically tight structure between the external ambient environment and the internal sensing cavity of the gas photoacoustic sensor.

Figure 7B:
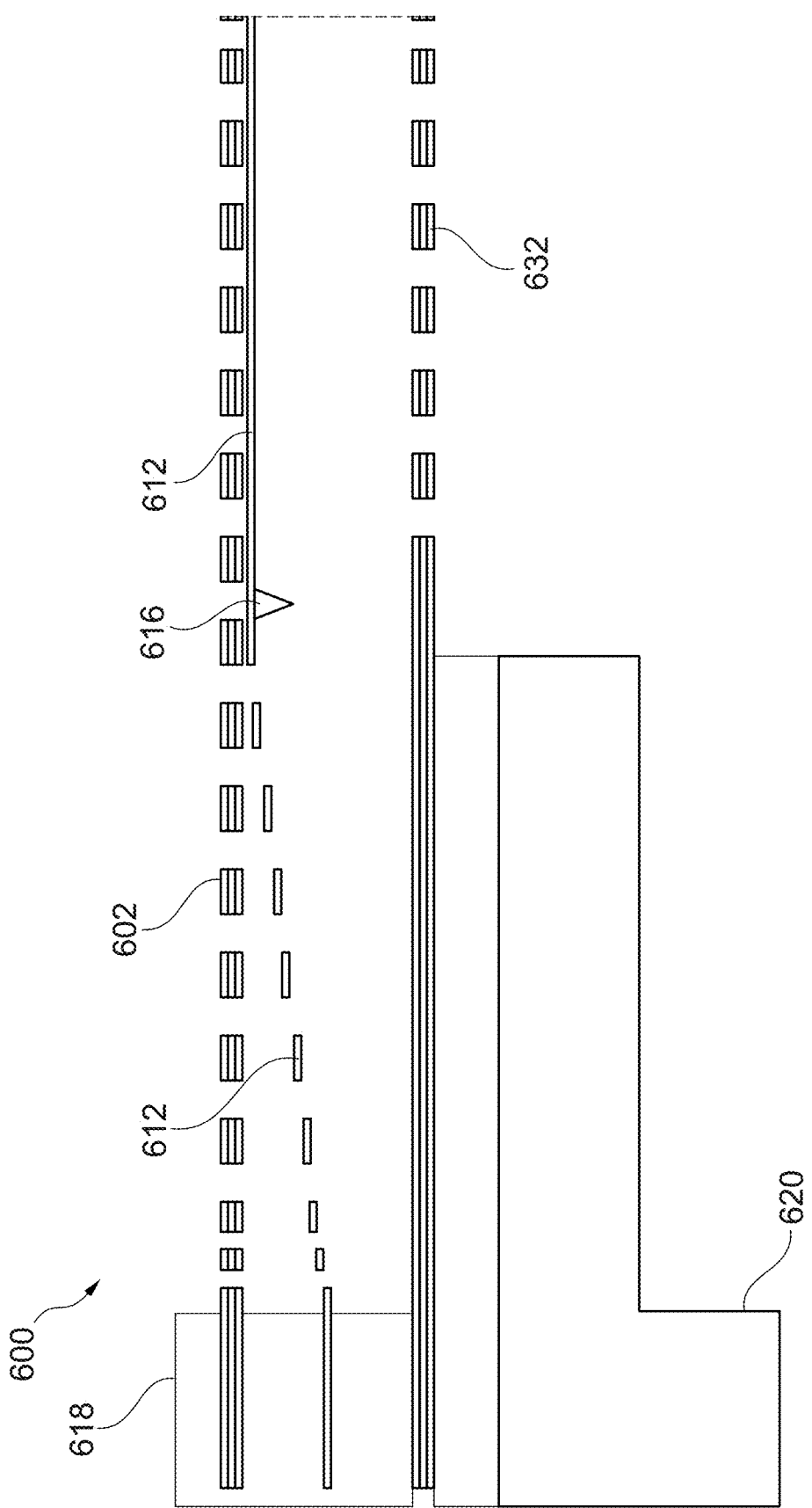
FIG. 7B is a cross-sectional view of the PAS valve of FIG. 6 in a resting configuration.

The double backplate embodiment of valve 600 shown in FIG. 6 and FIG. 7A is capable of active opening of the valve as well since the top backplate 602 perforations 650 and the membrane perforations 652 are congruent. In other words, in addition to the open and closed configurations previously described, an additional "resting" mode of operation is possible wherein the flexible membrane 612 is attracted to and rested against upper backplate 602 if desired. The resting configuration or mode of operation is shown in FIG. 7B. PAS valve 600 can be actively opened from the resting mode of operation so that switching from the open configuration to the closed configuration can be accomplished without overcoming the electrostatic forces present in the resting configuration.

Due to the application of electrostatic forces, it is possible to force a release of the flexible membrane 612 by pulling it to the top backplate 602. This can be helpful if the flexible membrane 612 is stuck to bottom backplate 632. Further-more, having the membrane 612 pulled to the top backplate 602 ("resting mode") leaves the system in a more confined state as the flexible membrane 612 is fixed to the top backplate 602 and cannot move as easily as in the previously described open mode. Additionally, by pulling the flexible membrane 112 upwards, the gap 636 is increased resulting in a larger diffusion path between bumpring 616 and the bottom backplate 632. This results in a lower diffusion time and thus in a faster sensor response.

Figure 8:
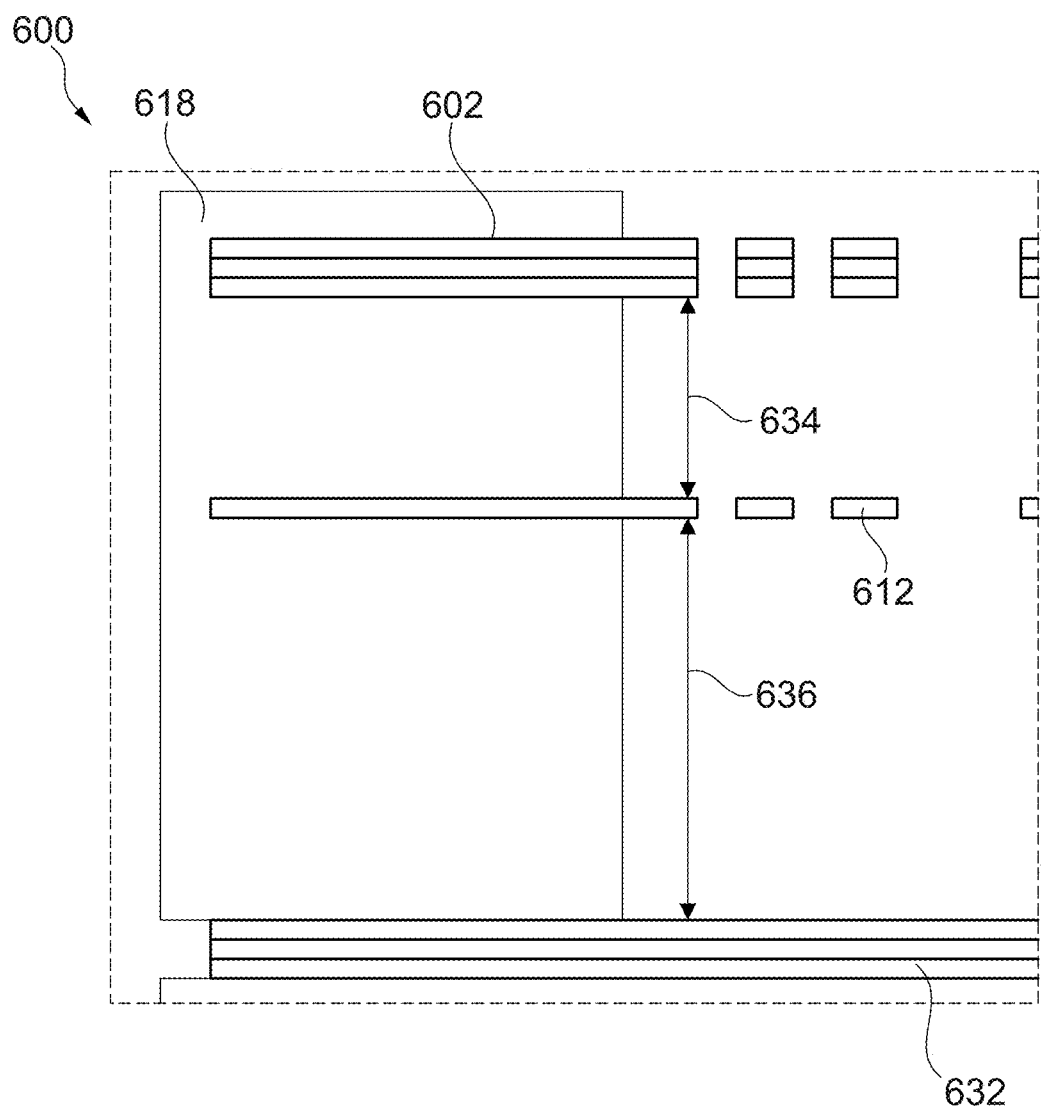
FIG. 8 is a cross-sectional view of the PAS valve of FIG. 6 in an open configuration, but including asymmetrical gaps between the membrane and each of the two backplates, according to another embodiment.

FIG. 8 is a cross-sectional view of a portion of the PAS valve 600 of FIG. 6 shown in an open configuration, but including asymmetrical gaps 634 and 636 between the membrane and each of the two backplates 602 and 632, according to another embodiment. In the embodiment of FIG. 8, the corresponding voltages to the backplates and membrane can be correspondingly adjusted to achieve the open and closed configurations. Gap 634 can be larger than gap 636 in an embodiment and the spacing values and corresponding applied voltages can also be changed as desired for a particular application.

Photoacoustic spectroscopy systems using low-cost photoacoustic sensors, as previously described, generally include an infrared light source such as a heater that applies heat to a sample of a gas from an ambient environment of the sensor, and a MEMS microphone to sense the pressure wave or sound caused by thermal expansion of the gas. Various other components in addition to the heater and the MEMS microphone can be used to help sense and refine the measurement of the gas concentration in the sample. Examples of a photoacoustic sensor in a packaged photoacoustic gas sensing system including a heater and a MEMS microphone are described below with reference to FIGS. 9 and 10.

Figure 9:
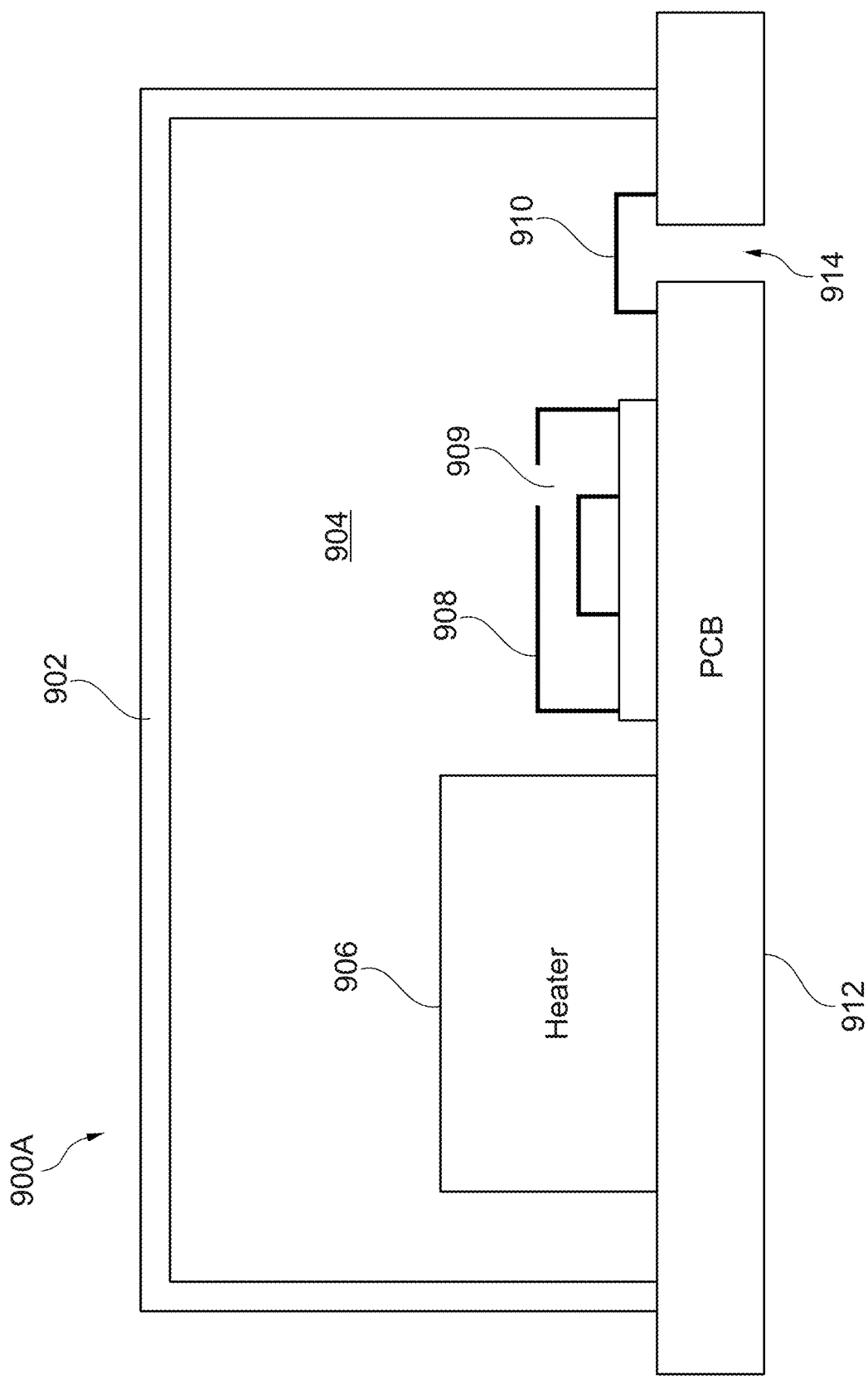
FIG. 9 is a cross-sectional view of a packaged photoacoustic gas sensing system including a PAS valve according to an embodiment.

FIG. 9 is a cross-sectional view of a packaged photoacoustic gas sensing system 900A including a hollow housing 902, an internal cavity 904 for containing a gas sample, a heater 906 for generating infrared radiation, a MEMS microphone 908 for sensing the pressure from the gas sample; and a PAS valve 910 over a soundport 914 in a Printed Circuit Board (PCB) 912, according to an embodiment. Heater 906 is affixed to an upper surface of the PCB 912 and is within cavity 904. The MEMS microphone 908 is also affixed to the upper surface of the PCB 912 and is also within cavity 904. The MEMS microphone 908 is typically configured in its own housing with a port 909 to sense the pressure from the gas sample as shown. As previously described, the PAS valve 910 may be distinct and separate from the MEMS microphone 908 depending on the embodiment, and is used for opening and closing the soundport 914. PAS valve 910 is not configured for sensing the pressure from the gas sample in some embodiments. In FIG. 9, the PAS valve 910 is shown as being placed on top of the soundport 914, with opposite ends of the valve being affixed to the top surface of the PCB 912. In other embodiments, the PAS valve 910 can be embedded in the PCB 912 of placed underneath the soundport 914.

Figure 10:
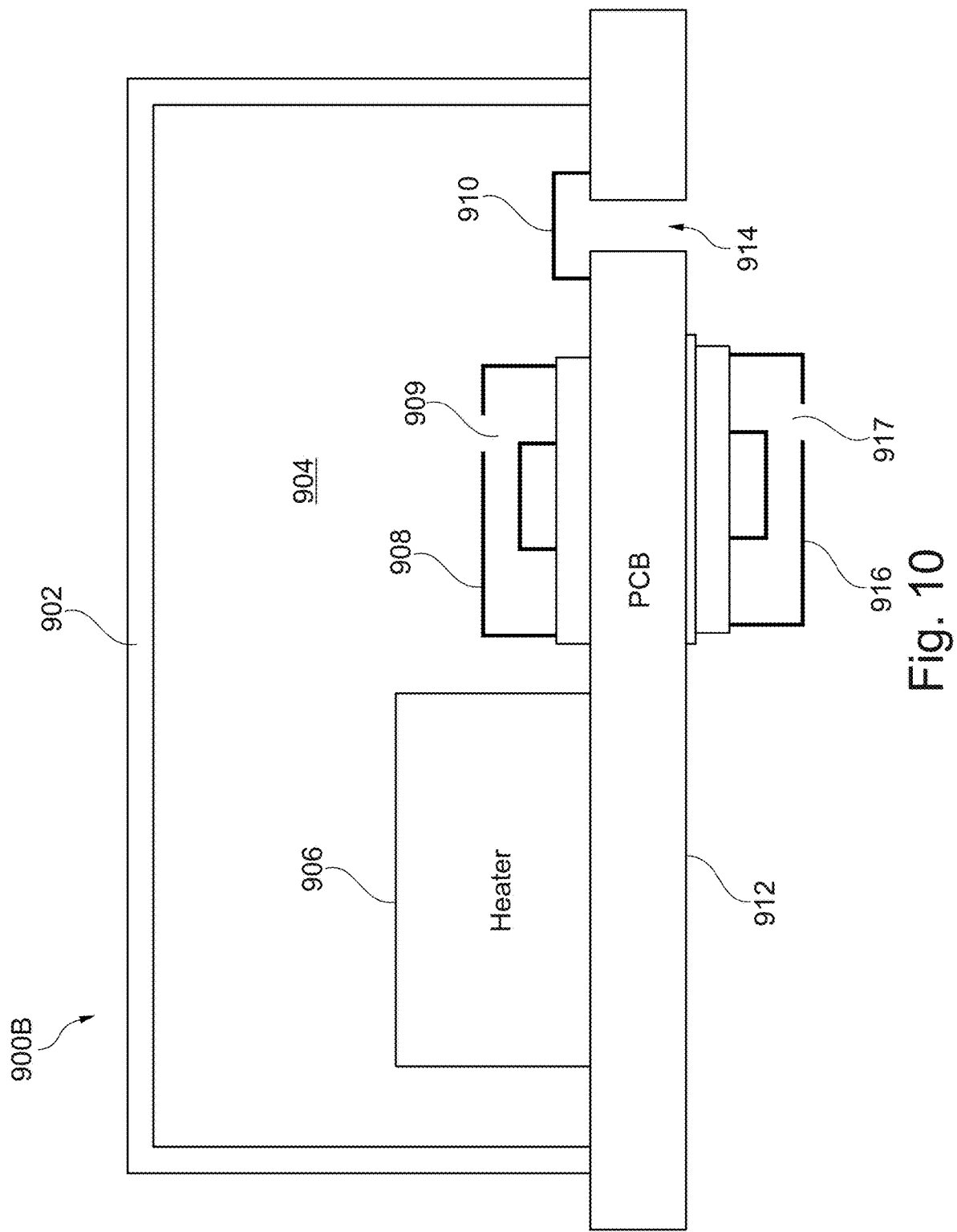
FIG. 10 is a cross-sectional view of the packaged photoacoustic gas sensing system of FIG. 9, but including an additional external MEMS microphone, according to another embodiment.

FIG. 10 is a cross-sectional view of the packaged photoacoustic gas sensing system of FIG. 9, but including an additional external MEMS microphone 916, according to another embodiment. The external MEMS microphone 916 can be used to detect the ambient sound level of the ambient environment through port 917. In an embodiment, PAS valve 910 is closed when the external sound level (determined by MEMS microphone 916) was determined to exceed a predetermined minimum sound level. For example, the predetermined minimum sound level can correlate to a sound level that begins to interfere with the measurement accuracy of the photoacoustic gas sensing system 900B.

In FIGS. 9 and 10 PAS valve 910 can be used in an analog mode of operation to change the acoustic impedance coupling to environmental acoustics. In other words, instead of a completely open or completely closed PAS valve 910, the valve can be partially opened (or partially closed) to an intermediate position to change the corresponding acoustic impedance. Suitable analog voltages can be applied to the membranes and backplates to the PAS valve 910 to achieve the intermediate position(s) and acoustic impedance(s) desired.

The analog valve mode of operation can be used in conjunction with a dual port MEMS microphone (not shown in FIG. 9 or FIG. 10). The analog valve mode of operation can be used to change the acoustic coupling impedance between the back volume (cavity 904) and front volume (ambient environment of the sensor). The analog valve mode of operation is controlled by analog switching signals applied to the membrane terminals, instead of digital switching signals that are used to fully close or open the MEMS valve. The corner frequency of each of the microphone ports can be adjusted to match a particular acoustic coupling impedance provided by the analog mode of operation.

Figure 11:
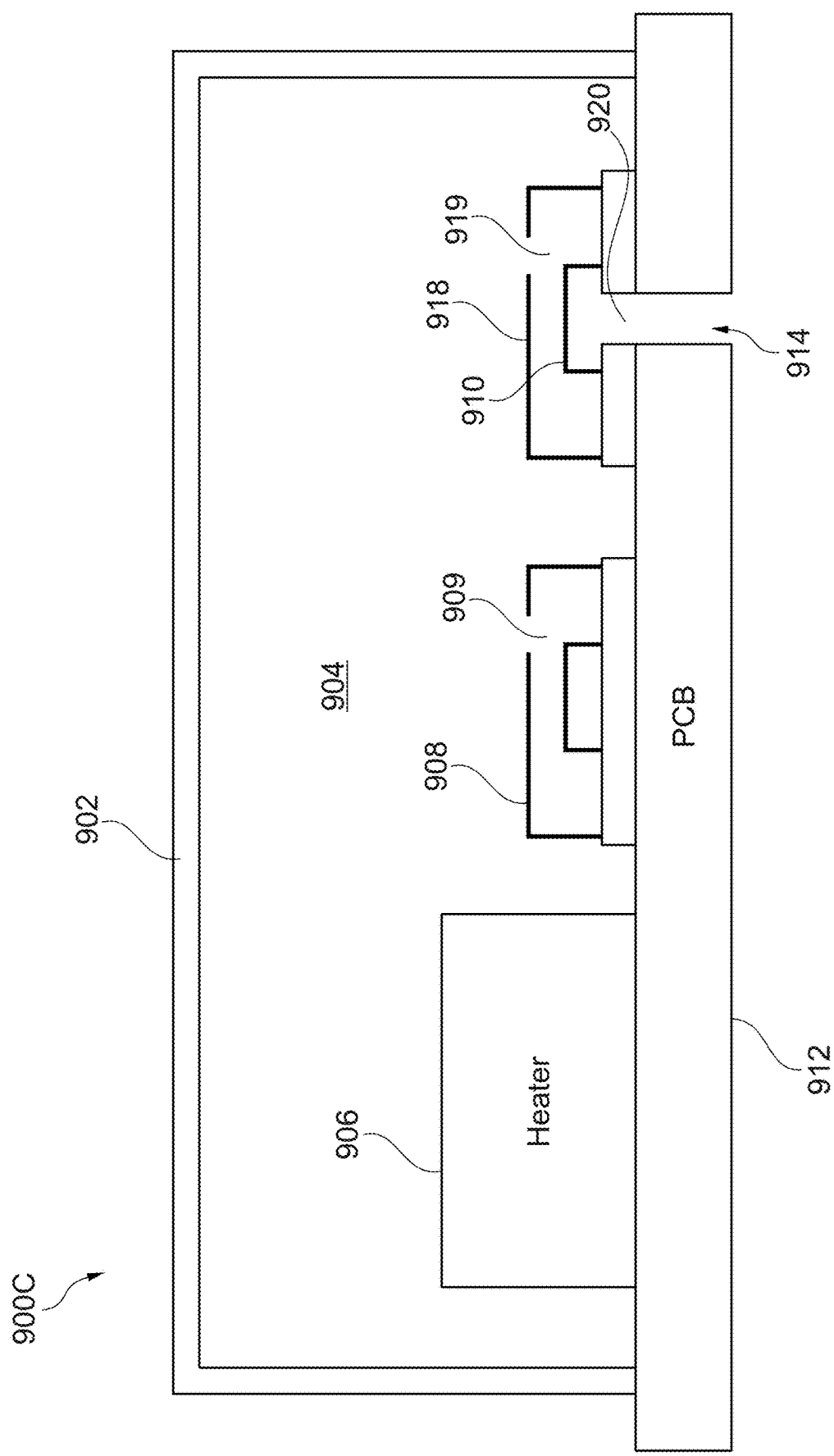
FIG. 11 is a cross-sectional view of the packaged photoacoustic gas sensing system of FIG. 9, but wherein the PAS valve is configured in its own housing in a dual port configuration.

The PAS valve 910 can also be configured in its own housing in a dual port configuration as is shown in FIG. 11. FIG. 11 is a cross-sectional view of a packaged photoacoustic gas sensing system 900C substantially as shown and described in FIG. 9, however PAS valve comprises a housing 918 having an upper port 919 and a lower port 920. In an embodiment, lower port 920 is congruent, overlapping, or at least partially aligned with soundport 914.

Figure 12:
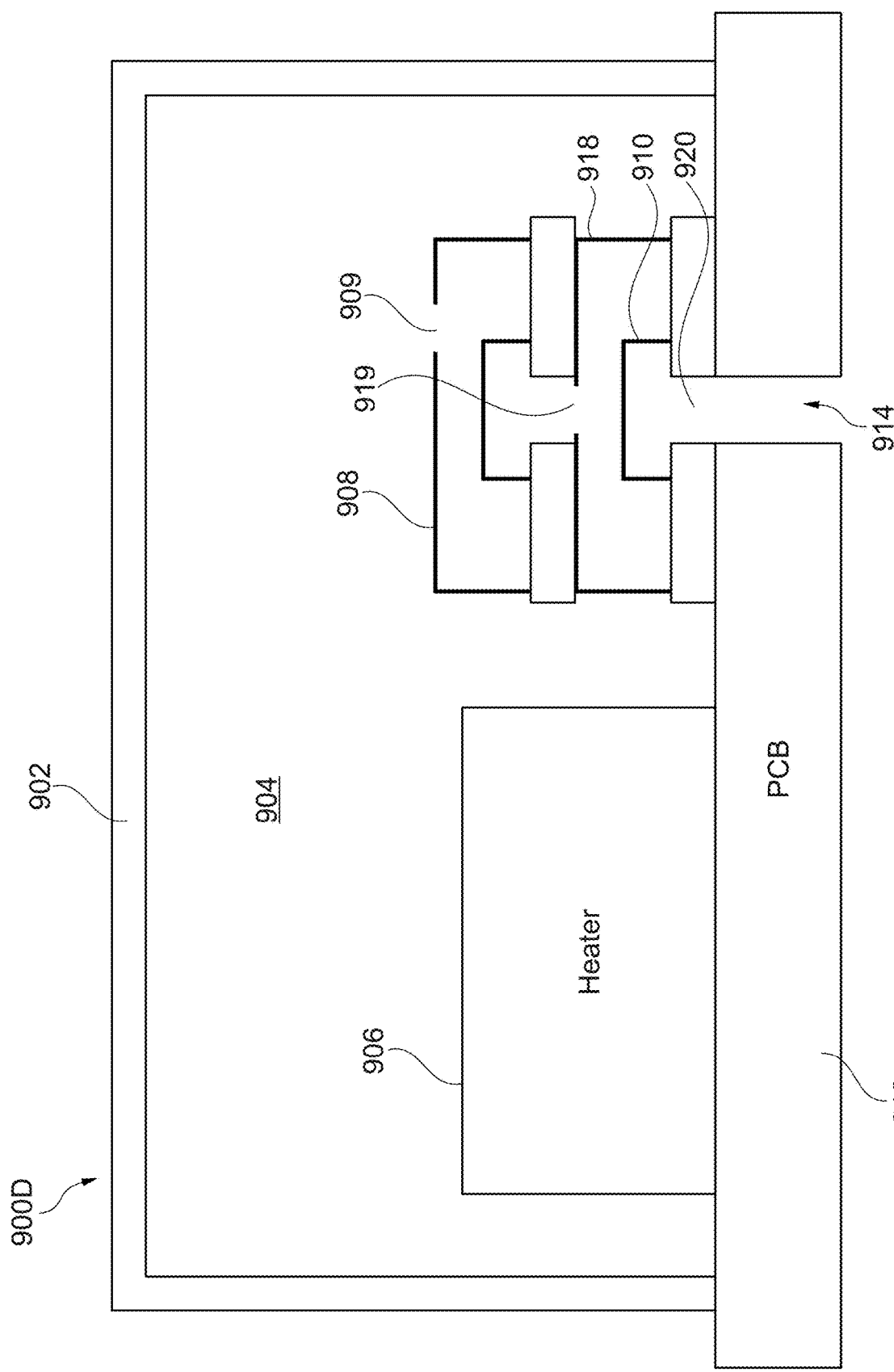
FIG. 12 is a cross-sectional view of the packaged photoacoustic gas sensing system of FIG. 9, but wherein a dual port microphone is mounted directly on top of a dual port PAS valve.

A dual port microphone can be mounted directly on top of the PAS valve, as is shown in FIG. 12. FIG. 12 is a cross-sectional view of a packaged photoacoustic sensing system 900D substantially as shown and described in FIG. 9. However, a dual port microphone has an upper port 909 and a lower port 919, which is also the upper port of PAS valve 910 housing 918. As in FIG. 11, the lower port 920 of PAS valve 910 is congruent, overlapping, or at least partially aligned with soundport 914, in an embodiment. In an open mode of operation, a diffusion path exist from the ambient environment through the lower port 920 of PAS valve 910, through the shared port 919 of PAS valve 910 and dual port microphone 908, and through the upper port 909 of dual port microphone 908, and into internal cavity 904.

The relative placement and configuration of the MEMS valve(s) with respect to the MEMS microphone(s) in a packaged photoacoustic gas sensing system can also be changed to include other configurations than those shown in FIGS. 9, 10, 11, and 12.

Figure 13A:
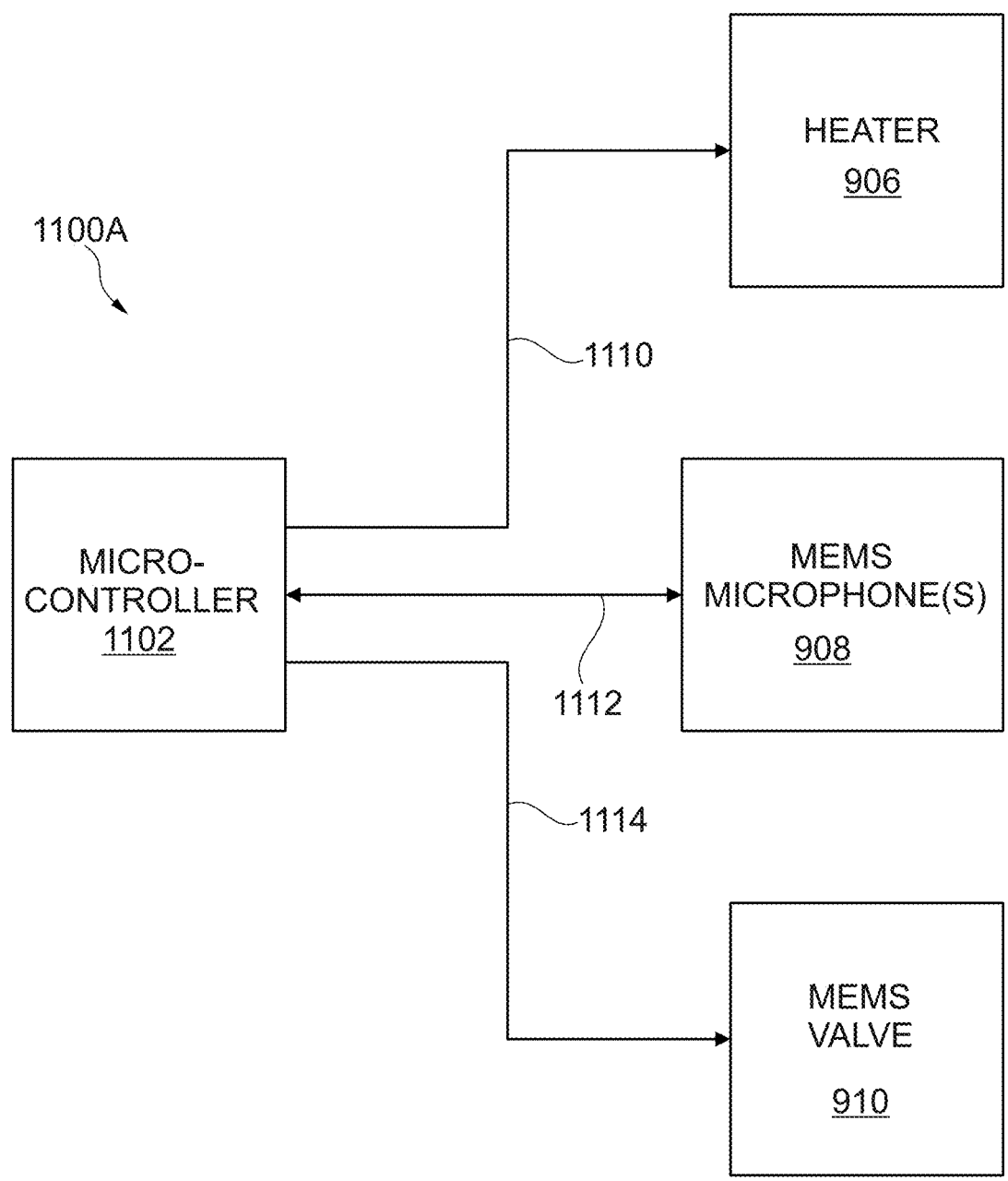
FIG. 13A is a first block diagram of the photoacoustic gas sensing system, according to an embodiment.

FIG. 13A is a block diagram 1100A of the photoacoustic gas sensing systems previously described and illustrated in FIGS. 9 and 10, according to embodiments. In pertinent part, the gas sensing system also includes a microcontroller 1102 coupled via conductor 1110 to gas heater 906. Gas heater 906 is turned on and off via a driving signal provided by microcontroller 1102. Microcontroller 1102 is also coupled via bus 1112 to MEMS microphones 908. The MEMS microphones receive a driving signal from controller 1102 and provide data to controller 1102 through the bus 1112. Microcontroller 1102 is also coupled via conductor 1114 to MEMS valve 910. The MEMS valve 910 receives digital and analog driving signals with appropriate voltage levels from microcontroller 1102. The microcontroller 1102 and any external circuitry can comprise readily available components, or can be integrated together on a custom ASIC.

Figure 13B:
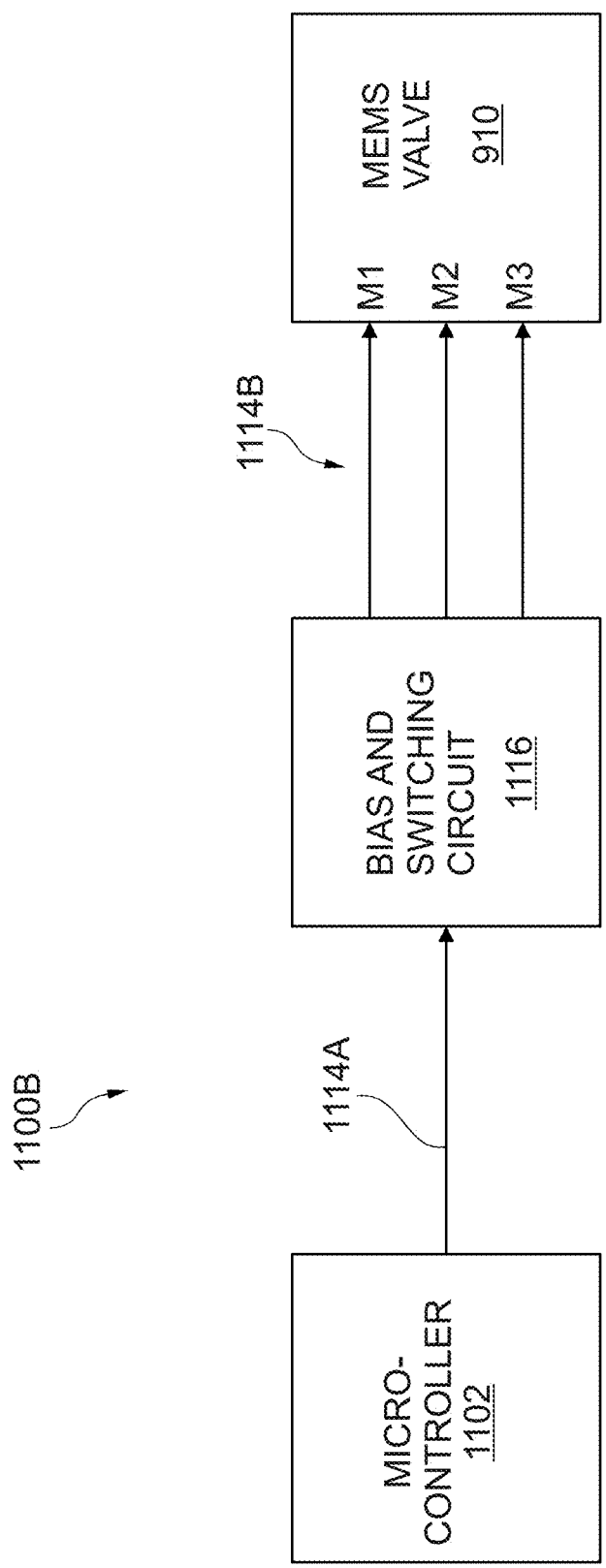
FIG. 13B is a second block diagram of the photoacoustic gas sensing system, according to an embodiment.

FIG. 13B is a block diagram 1100B of the photoacoustic gas sensing system shown in FIG. 13A, but including further details for biasing and switching MEMS valve 910. In an embodiment, circuitry external to the microcontroller 1102, such as bias and switching circuit 1116, can be used to provide the appropriate driving and biasing signals. Conductor 1114 previously shown in FIG. 13A includes a first portion 1114A for coupling the microcontroller 1102 to the bias and switching circuit 1116. Conductor 1114 also includes a second portion 1114B for coupling the bias and switching circuit 1116 to the individual membrane terminals M1, M2, and M3 of MEMS valve 910. Bias and switching circuit 1116 is configured to provide digital switching signals and biasing voltages to the individual membrane terminals of MEMS valve 910, in an embodiment. Bias and switching circuit 1116 can also be configured to provide analog switching signals and biasing voltages to the individual membrane terminals of MEMS valve in another embodiment. Bias and switching circuit 1116 can also be configured to provide a combination of analog and digital switching signals, and biasing voltages in another embodiment. Bias and switching circuit 1116 can include a plurality of switching elements, such as transistors, comparators, or operational amplifiers or other circuit elements for providing the desired switching voltages and a plurality of biasing elements such as voltage divider circuits and buffer amplifiers, or the like for providing the desired biasing voltages.

Figure 14:
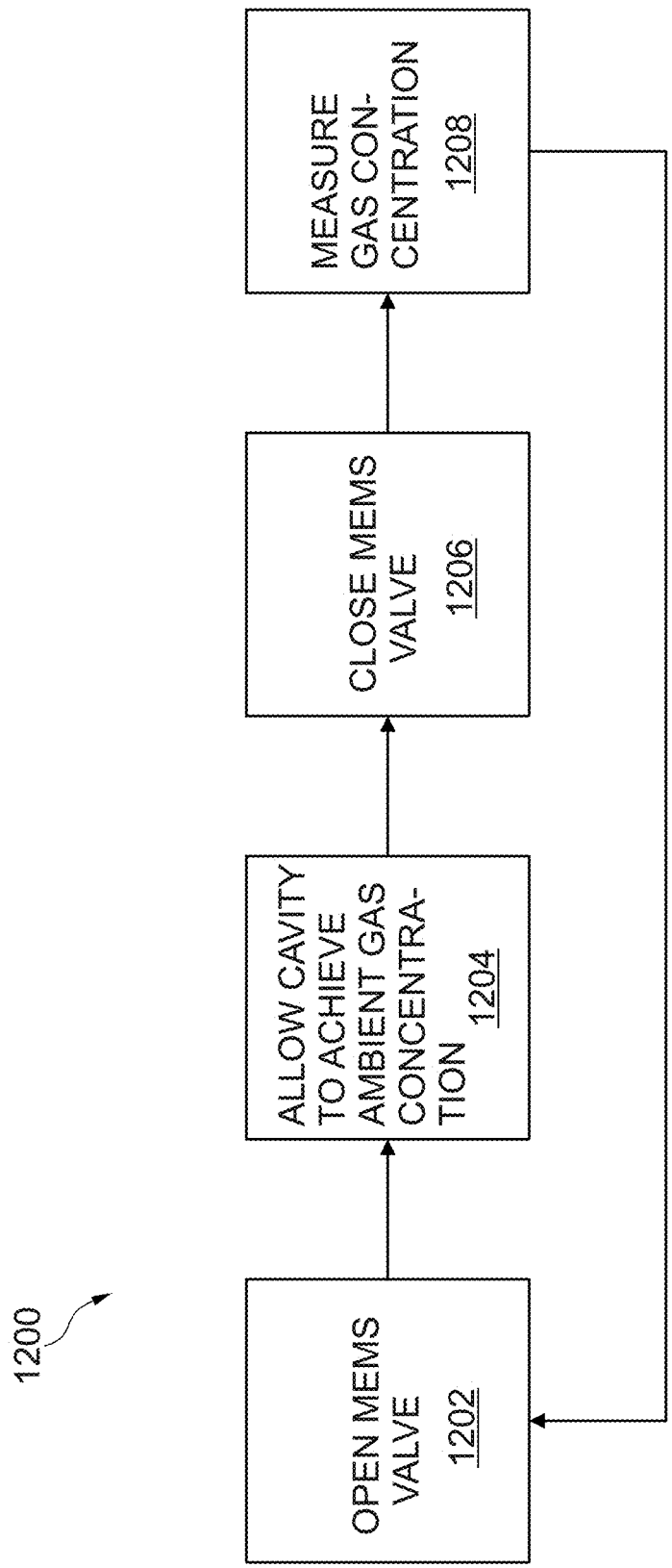
FIG. 14 is a flow chart of the method of operating a photoacoustic gas sensing system, according to an embodiment.

FIG. 14 is a flow chart 1200 of the method of operating a photoacoustic gas sensing system, according to an embodiment. At step 1202 the MEMS valve over the soundport is opened to allow ambient gas to diffuse into the cavity of the gas sensor. The MEMS valve is opened by applying a voltage configured to open the MEMS valve for a first predetermined period time that allows for the ambient gas to diffuse into the cavity of the gas sensor. At step 1204, the sensor is allowed to achieve a maximum ambient gas concentration. The MEMS valve is thus kept open for a full duration of the first predetermined period of time. At step 1206 the MEMS valve over the soundport is closed. The MEMS valve is closed by applying appropriate switching signals configured to close the MEMS valve for a second predetermined period of time that allows the gas concentration measurement to be conducted. At step 1208, the gas concentration within the cavity of the sensor is measured while the MEMS valve is held closed during the second predetermined period of time. After a measurement is taken, the method can be repeated at step 1202. In an embodiment, the duration of the open configuration of the valve (first predetermined period of time) and the duration of the closed configuration of the valve (second predetermined period of time) are each about one second in duration. Different duty cycles and different time periods for the method of operating the photoacoustic gas sensing system can be used. The MEMS valve over the soundport can be closed at step 1206 if the external sound level is above a minimum sound level as previously discussed.

Figure 17:
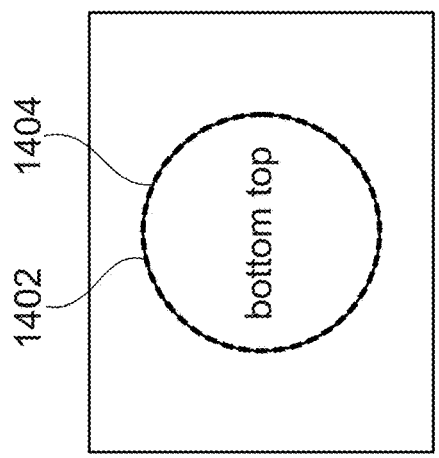
FIGS. 15, 16, and 17 illustrate further embodiments for adjusting the diffusion speed through the PAS valve by adjusting various perforation configurations.
Figure 16:
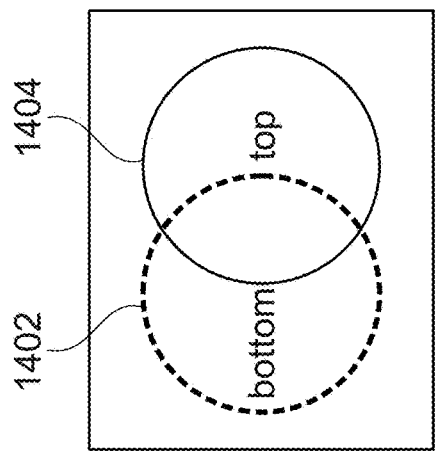
Figure 15:
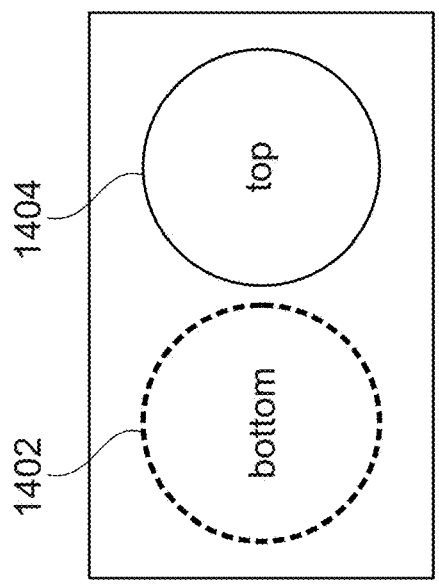

FIGS. 15, 16, and 17 illustrate further embodiments for adjusting the diffusion speed through the PAS valve by adjusting various perforation configurations. Acoustic suppression is one parameter that can be adjusted as previously described. A second parameter that can be adjusted according to embodiments is diffusion speed. Thus, the PAS valve described herein can also be used as diffusion barrier with or without coupling to the acoustic impedance. For example if a gas concentration measurement takes longer than the acoustic signal, the gas concentration needs to be kept constant or defined in the required measurement time period.

FIG. 15 shows a bottom membrane or backplate hole 1402 and a top membrane or backplate hole 1404 of the non-overlapping type previously described. In a closed configuration, this embodiment provides low diffusion speed and high acoustic suppression. The low diffusion speed is provided by a composite solid surface substantially obstructing the flow of the gas molecules. The high acoustic suppression is also provided by a composite solid surface substantially deflecting and attenuating the sound pressure of the acoustic waves. In FIG. 15, the relative spacings between the top and bottom holes could be different. The farther apart the top and bottom holes are spaced, a lower the diffusion speed and a higher acoustic suppression is provided.

FIG. 16 shows a bottom membrane or backplate hole 1402 and a top membrane or backplate hole 1404, wherein the holes are partially overlapping. In a closed configuration, this embodiment provides low diffusion speed and low acoustic suppression. The low diffusion speed is provided by a composite solid surface partially obstructing the flow of the gas molecules. The low acoustic suppression is also provided by a composite solid surface partially deflecting and attenuating the sound pressure of the acoustic waves. In FIG. 16, the relative overlapping spacings between the top and bottom holes could be different. The diffusion speeds and acoustic suppression can be changed by increasing and decreasing the amount of overlap shown in FIG. 14.

FIG. 17 shows a bottom membrane or backplate hole 1402 and a top membrane or backplate hole 1404, wherein the holes a completely overlapping. In a closed configuration, this embodiment provides high diffusion speed and low acoustic suppression. In FIG. 17, the diffusion speed is at a maximum, because there is no impediment to the diffusion of gas molecules through the completely overlapping bottom and top holes. The hole width can be changed, however, to change the diffusion speed if desired. Similarly, there is no impediment to the conduction of sound waves through the completely overlapping bottom and top holes. The hole width can also be changed, however, to change the already low acoustic suppression within a corresponding low range.

Thus, the hole placements shown in FIGS. 15, 16, and 17 can be used individually or in combination with each other to tailor the exact diffusion speed and amount of acoustic suppression needed to match the requirements of a specific application over a wide range of diffusion speeds and acoustic suppression levels.

The MEMS valve used as PAS valve has been described herein as a component of a photoacoustic gas sensor. However, the MEMS valve can also be a discrete component that may have additional uses. For example, any application requiring acoustic suppression and selective diffusion speeds may benefit from using the MEMS valve described herein.

In summary, a MEMS valve or interface has been described having at least two states of acoustic impedance. A first state has an acoustic impedance that is substantially acoustically transparent and defined as an open state. A second state has an acoustic impedance that is acoustically blocking and defined as a closed states. Optional additional analog states are also provided and described. Two plates or membranes of the MEMS valve are electrostatically actuated to open and close an acoustic transmission path therethrough.

Various specific sizes, dimensions, and shapes of component parts of a MEMS valve and a photoacoustic sensor have been described herein. All of these specific sizes, dimensions, and shapes can be changed and adapted to function in a specific application as desired.

Thus, while this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:
   a package having a cavity and a port;
   a photoacoustic gas sensor device disposed within the package and adjacent to the cavity; and
   a Micro Electro Mechanical System ("MEMS") valve separate from the photoacoustic gas sensor device disposed at the port of the package and configured to allow ambient gas diffusion into the cavity in a first mode of operation, and to prevent ambient gas diffusion into the cavity and to acoustically isolate the cavity in a second mode of operation, wherein the MEMS valve comprises a first perforated backplate and a perforated membrane, wherein perforations in the first perforated backplate and perforations in the perforated membrane are non-overlapping in a plan view, and wherein the perforated membrane and the first perforated backplate are in an open configuration in the first mode of operation and in a closed configuration in the second mode of operation.

2. The system of claim 1, wherein the first perforated backplate comprises a perforated insulated silicon layer, and wherein the perforated membrane comprises a perforated silicon layer.

3. The system of claim 1, further comprising a cantilevered silicon substrate under the first perforated backplate and the perforated membrane.

4. The system of claim 1, wherein the perforations in the first perforated backplate are arranged in a hexagonal or circular radial concentric pattern, and the perforations in the membrane are arranged in a non-overlapping hexagonal or circular radial concentric pattern.

5. The system of claim 1, wherein the MEMS valve comprises a second perforated backplate, and wherein the perforated membrane is between the first perforated backplate and the second perforated backplate.

6. The system of claim 5, wherein a gap length between the first perforated backplate and the perforated membrane is different from a gap length between the second perforated backplate and the perforated membrane.

7. A method of operating a photoacoustic gas sensor device, the method comprising:
   opening a Micro Electro Mechanical System ("MEMS") valve at a port of the photoacoustic gas sensor to allow gas diffusion through the port and into a cavity of the photoacoustic gas sensor in a first mode of operation; and
   closing the MEMS valve to prevent gas diffusion through the port and into the cavity of the photoacoustic gas sensor and to acoustically isolate the cavity of the photoacoustic gas sensor in a second mode of operation,
   wherein the MEMS valve is not configured to sense internal gas pressure of the photoacoustic gas sensor device, and wherein the MEMS valve comprises a backplate having a first set of perforations and a membrane having a second set of perforations non-overlapping with the first set of perforations.

8. The method of claim 7, wherein the MEMS valve is closed only if an ambient sound level is above a predetermined minimum sound level.

9. The method of claim 7, further comprising allowing the cavity to attain an ambient gas concentration during the first mode of operation.

10. The method of claim 9, further comprising measuring the gas concentration in the cavity during the second mode of operation.

11. The method of claim 7, wherein the backplate and the membrane of the MEMS valve are placed in an open configuration in the first mode of operation, and wherein the backplate and the membrane of the MEMS valve are placed in a closed configuration in the second mode of operation.

12. The method of claim 11, wherein the open and closed configurations are attained by electrostatic forces caused by selectively energizing at least one of the backplate and membrane.

* * * * *